US008726260B2

(12) United States Patent
Vanover et al.

(10) Patent No.: US 8,726,260 B2
(45) Date of Patent: May 13, 2014

(54) TECHNIQUES FOR PROVIDING SOFTWARE PATCHES TO A COMPUTER SYSTEM

(75) Inventors: Michael T. Vanover, Raleigh, NC (US); Richard W. Cheston, Morrisville, NC (US); Daryl Cromer, Cary, NC (US); Howard Locker, Cary, NC (US); Randall S. Springfield, Chapel Hill, NC (US)

(73) Assignee: Lenovo (Singapore) Pte Ltd, Singapore (SG)

( * ) Notice: Subject to any disclaimer, the term of this patent is extended or adjusted under 35 U.S.C. 154(b) by 1164 days.

(21) Appl. No.: 11/944,887

(22) Filed: Nov. 26, 2007

(65) Prior Publication Data
US 2009/0138868 A1 May 28, 2009

(51) Int. Cl.
*G06F 9/44* (2006.01)
*H04B 1/38* (2006.01)

(52) U.S. Cl.
USPC ........... 717/168; 717/171; 717/172; 717/173; 455/557

(58) Field of Classification Search
None
See application file for complete search history.

(56) References Cited

U.S. PATENT DOCUMENTS

| | | | | |
|---|---|---|---|---|
| 6,370,143 B1 * | 4/2002 | Yamagishi | ..................... | 370/390 |
| 6,772,169 B2 * | 8/2004 | Kaplan | .................. | 1/1 |
| 6,970,565 B1 * | 11/2005 | Rindsberg | ..................... | 380/270 |
| 6,981,061 B1 * | 12/2005 | Sakakura | ......................... | 709/248 |
| 6,990,353 B2 * | 1/2006 | Florkey et al. | ................. | 455/519 |
| 7,103,353 B2 * | 9/2006 | Suzuki | ....................... | 455/414.2 |
| 7,165,173 B1 * | 1/2007 | Herle | ............................. | 713/151 |
| 7,197,302 B2 * | 3/2007 | Date et al. | ...................... | 455/419 |
| 7,373,139 B2 * | 5/2008 | Suzuki | ....................... | 455/414.2 |
| 7,480,907 B1 * | 1/2009 | Marolia et al. | ................. | 717/174 |
| 7,555,750 B1 * | 6/2009 | Lilley | ............................ | 717/168 |
| 7,586,875 B2 * | 9/2009 | Landais et al. | ................ | 370/331 |
| 7,634,262 B1 * | 12/2009 | Li | .................................. | 455/419 |
| 7,640,491 B2 * | 12/2009 | Goodacre et al. | ............. | 715/234 |
| 7,644,405 B2 * | 1/2010 | Rao et al. | ...................... | 717/171 |
| 7,716,661 B2 * | 5/2010 | Paul et al. | ...................... | 717/173 |
| 7,735,078 B1 * | 6/2010 | Vaidya | ........................ | 717/171 |
| 7,774,026 B2 * | 8/2010 | Hayashi et al. | ............... | 455/557 |

(Continued)

FOREIGN PATENT DOCUMENTS

DE 102006002391 A1 7/2007
EP 1672938 A1 * 6/2006

(Continued)

OTHER PUBLICATIONS

"A Framework for Over the Air Provider-initiated Software Deployment on Mobile Devices", Chuong Cong Vo et al., 2008, pp. 1-6, <http://homepage.cs.latrobe.edu.au/ccvo/papers/ChuongVoASWEC2008CameraR.pdf>.*

(Continued)

*Primary Examiner* — Thuy Dao
*Assistant Examiner* — Ziaul A Chowdhury
(74) *Attorney, Agent, or Firm* — Antony P. Ng; Yudell Isidore Ng Russell PLLC

(57) ABSTRACT

A technique for providing a software patch to an associated computer system includes receiving, at a wireless communication device, a communication. Next, it is determined, at the wireless communication device, whether the communication is associated with a software patch available for the associated computer system. When the communication is associated with the software patch, a notification is sent from the wireless communication device to the associated computer system that the software patch is available.

3 Claims, 3 Drawing Sheets

(56) References Cited

U.S. PATENT DOCUMENTS

| | | | |
|---|---|---|---|
| 7,810,088 B2* | 10/2010 | Herle et al. | 717/173 |
| 7,827,545 B2* | 11/2010 | Choe et al. | 717/168 |
| 7,831,966 B2* | 11/2010 | Costanza et al. | 717/168 |
| 7,881,268 B1* | 2/2011 | Tong | 370/338 |
| 7,890,427 B1* | 2/2011 | Rao et al. | 705/51 |
| 8,301,195 B2* | 10/2012 | Warren et al. | 455/557 |
| 8,527,981 B2* | 9/2013 | Oikawa et al. | 717/173 |
| 2002/0004402 A1* | 1/2002 | Suzuki | 455/456 |
| 2002/0129107 A1* | 9/2002 | Loughran et al. | 709/206 |
| 2002/0137522 A1* | 9/2002 | Landais et al. | 455/455 |
| 2003/0061106 A1* | 3/2003 | Orhomuru | 705/26 |
| 2004/0009777 A1* | 1/2004 | Koskimies et al. | 455/456.1 |
| 2004/0098715 A1* | 5/2004 | Aghera et al. | 717/173 |
| 2004/0107417 A1* | 6/2004 | Chia et al. | 717/171 |
| 2004/0176100 A1* | 9/2004 | Florkey et al. | 455/456.1 |
| 2004/0210653 A1* | 10/2004 | Kanoor et al. | 709/223 |
| 2004/0214559 A1* | 10/2004 | Date et al. | 455/418 |
| 2005/0060198 A1* | 3/2005 | Bayne | 705/2 |
| 2005/0060528 A1* | 3/2005 | Kim | 713/1 |
| 2005/0132349 A1* | 6/2005 | Roberts et al. | 717/168 |
| 2005/0154759 A1* | 7/2005 | Hofmeister et al. | 707/104.1 |
| 2005/0262498 A1* | 11/2005 | Ferguson et al. | 717/172 |
| 2005/0268297 A1* | 12/2005 | Kovachka-Dimitrova et al. | 717/171 |
| 2006/0101082 A1* | 5/2006 | Agrawal et al. | 707/200 |
| 2006/0106806 A1* | 5/2006 | Sperling et al. | 707/10 |
| 2006/0230395 A1* | 10/2006 | Paul et al. | 717/173 |
| 2006/0240849 A1* | 10/2006 | Suzuki | 455/465 |
| 2007/0082657 A1* | 4/2007 | Kim | 455/412.2 |
| 2007/0083653 A1* | 4/2007 | Chandrasekaran et al. | 709/225 |
| 2007/0124459 A1 | 5/2007 | Kasama | |
| 2007/0198698 A1* | 8/2007 | Boyd et al. | 709/224 |
| 2008/0160983 A1* | 7/2008 | Poplett et al. | 455/419 |
| 2009/0083727 A1* | 3/2009 | Fu et al. | 717/172 |

FOREIGN PATENT DOCUMENTS

| | | |
|---|---|---|
| EP | 1717699 A1 | 11/2006 |
| EP | 1850226 A1 | 10/2007 |
| JP | 10-303983 | 4/1997 |
| JP | 2001-318847 | 11/2001 |
| JP | 2006-309516 | 11/2006 |
| KR | 20020096105 A | 12/2002 |
| WO | 2005026868 A2 | 3/2005 |

OTHER PUBLICATIONS

Rohith Suresh, "Context Aware Mobile Phone Notification", [Online], Sep. 2005, pp. 1-86, [Retrieved from Internet on Jun. 9, 2013], <https://personal.cis.strath.ac.uk/mark.dunlop/misc/cit/projects/library/05/Rohith.pdf>.*

Sudharshana M et al., "OTA Moblile Device Software Management", [Online], 2002, pp. 1-7, [Retrieved from Internet on Jun. 9, 2013], <http://citeseerx.ist.psu.edu/viewdoc/download?doi=10.1.1.114.1274&rep=rep1&type=pdf>.*

A.K. Othman et al., "Wireless Sensor Networks for Swift Bird Farms Monitoring", [Online], IEEE2009, pp. 1-7, [Retrieved from Internet on Jun. 9, 2013], <http://www.alpsayin.com/master_thesis/literature/Wireless%20Sensor%20Networks%20for%20Swift%20-Bird%20Farms.pdf>.*

Tobin J. Lehman et al., "Hitting the distributed computing sweet spot with TSpaces", [Online], Computer Network, 2001, pp. 457-472, [Retrived from Internet on Jun. 9, 2013], <http://www.almaden.ibm.com/cs/tspaces/papers/ComputerNetworks.pdf>.*

Marco Ughetti et al., "Development of agent-based, peer-to-peer mobile applications on Android with Jade", [Online], IEEE 2008, pp. 287-294, [Retrived from Internet on Dec. 30, 2013], <http://ieeexplore.ieee.org/stamp/stamp.jsp?tp=&arnumber=4641350>.*

Hagen Höpfner et al., "An Indexing Scheme for Update Noti_cation in Large Mobile Information Systems", [Online], 2005, pp. 1-10, [Retrieved from Internet on Dec. 30, 2013], <http://wwwiti.cs.uni-magdeburg.de/iti_db/veroeffentlichungen/ps/04/edbt_pim04_post.pdf>.*

Benou Poulcheria et al., "A Software Architecture for Provision of Context-Aware Web-based m-Commerce Applications", [Online], 2011, pp. 1-6, [Retrieved from Internet on Dec. 30, 2013], <http://sdbs.dit.uop.gr//files/benou-SoftwareArchitecture.pdf>.*

Eiko Yoneki, "Mobile Applications with a Middleware System in Publish-Subscribe Paradigm", [Online], 2003, pp. 1-12, [Retrieved from Internet on Dec. 30, 2013], <http://citeseerx.ist.psu.edu/viewdoc/download?doi=10.1.1.145.7324&rep=rep1&type=pdf>.*

UK Patent Office, UK Patent Application No. GB 0821054.4; Combined Search and Examination Report dated Feb. 10, 2009.

"Widening option of patch management, Section 1, How far has the laborsaving in patch management progressed?" Directions on Microsoft Japanese Edition, May 2005(No. 41), Mediaselect Corporation, May 16, 2005, p. 8-10.

"Easy to understand from charts. Working of mobile phone business." Asuka Shyuppansya (Aska publishing), Nov. 30, 2000. Taro Fujisawa, p. 102-105.

* cited by examiner

TECHNIQUES FOR PROVIDING SOFTWARE PATCHES TO A COMPUTER SYSTEM

BACKGROUND

1. Field

This disclosure relates generally to software patches and, more specifically to techniques for providing software patches to a computer system.

2. Related Art

Frequently, it is desirable to provide a software patch to a computer system. For example, an information technology (IT) department of a company may desire to push an emergency software patch to each computer system that is associated with a computer network of the company. In order to successfully push a software patch to each computer system that is associated with a computer network of a company, all computer systems associated with the computer network must be powered-up and in communication with the computer network. In a typical case, one or more computer systems associated with a computer network may not be in communication with the computer network when a software patch is pushed. For example, portable computer systems, such as notebooks, handheld, and laptops, are frequently not in communication with a computer network when employees assigned to the portable computer systems are out of the office. In this case, when a software patch is pushed, an application or operating system (OS) of a portable computer system may not be updated in a timely manner. As such, a portable computer system may experience image problems or data loss due to the software patch not being integrated in the portable computer system.

As is known, Bluetooth™ is a specification for wireless personal area networks (PANs). Bluetooth™ interfaces provide a way for Bluetooth™ enabled devices (such as mobile telephones, modems, headsets, computer systems, printers, digital cameras, and video game consoles) to connect and exchange information. In general, Bluetooth™ interfaces are designed for relatively low-power consumption and relatively short-range communication. Bluetooth™ interfaces are commonly used to transfer files from mobile telephones or personal digital assistants (PDAs) to computers systems.

SUMMARY

According to one aspect of the present disclosure, a technique for providing software patches to an associated computer system includes receiving, at a wireless communication device, a communication. Next, it is determined, at the wireless communication device, whether the communication is associated with a software patch available for the associated computer system. When the communication is associated with a software patch, a notification is sent from the wireless communication device to the associated computer system that the software patch is available.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
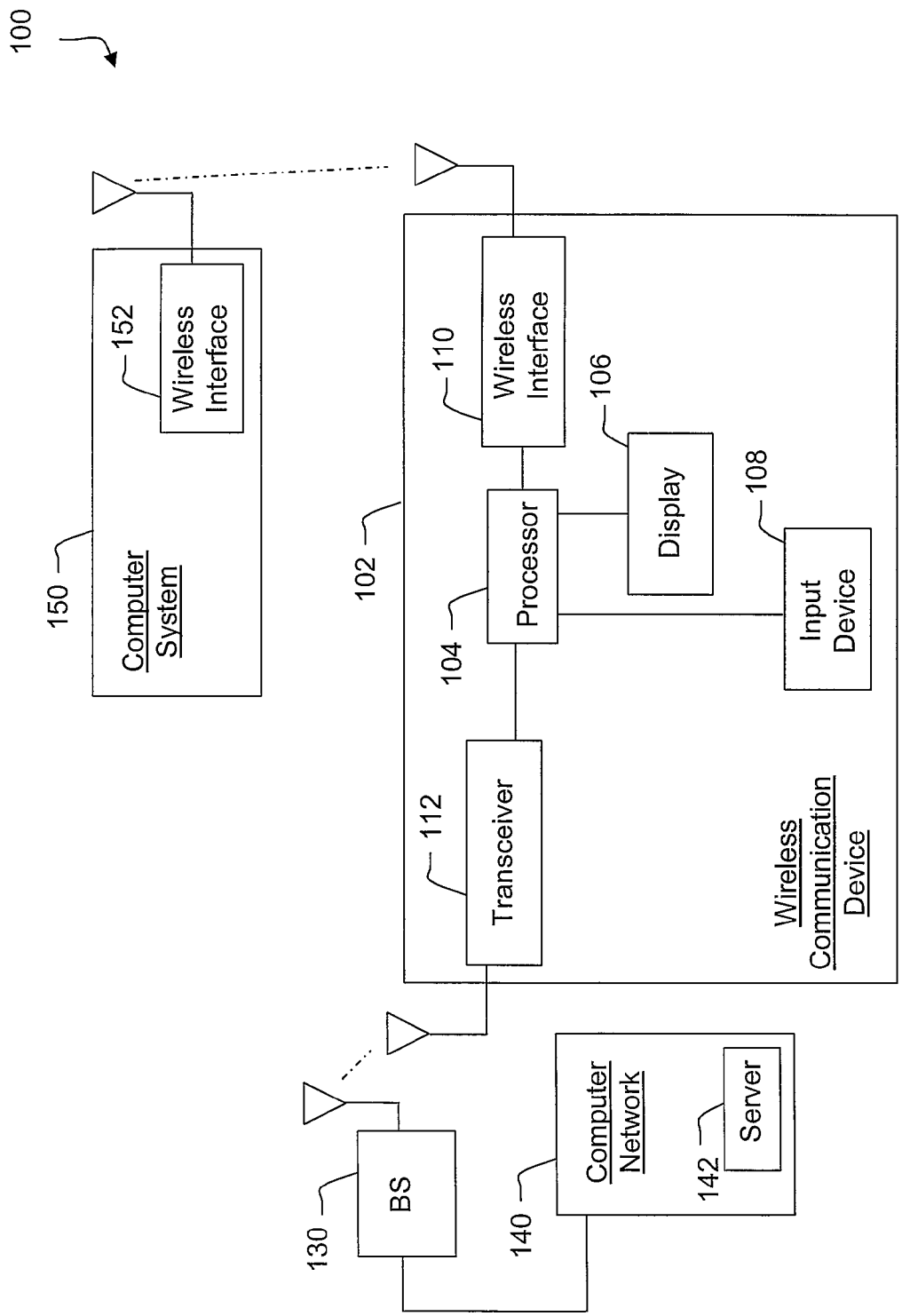
FIG. 1 is a block diagram of an example configuration for a wireless communication device that is configured to provide a software patch notification to an associated computer system that is not in current communication with a computer network.

As will be appreciated by one of ordinary skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product on a computer-usable storage medium having computer-usable program code embodied in the medium.

Any suitable computer-usable or computer-readable storage medium may be utilized. The computer-usable or computer-readable storage medium may be, for example, but is not limited to, an electronic, magnetic, optical, electromagnetic, infrared, or semiconductor system, apparatus, or device. More specific examples (a non-exhaustive list) of the computer-readable storage medium include the following: a portable computer diskette, a hard disk, a random access memory (RAM), a read-only memory (ROM), an erasable programmable read-only memory (EPROM) or Flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain or store the program for use by or in connection with an instruction execution system, apparatus, or device.

Computer program code for carrying out operations of the present invention may be written in an object oriented programming language, such as Java, Smalltalk, C++, etc. However, the computer program code for carrying out operations of the present invention may also be written in conventional procedural programming languages, such as the "C" programming language or similar programming languages. The program code may execute entirely on a single processor, on multiple processors that may be remote from each other, or as a stand-alone software package.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. As used herein, the term "coupled" includes both a direct electrical connection between blocks or components and an indirect electrical connection between blocks or components achieved using intervening blocks or components.

The present disclosure takes advantage of the fact that wireless communication devices (e.g., mobile telephones) are ubiquitous in society today. A wireless communication device of an individual is usually powered and capable of receiving a communication even when a portable computer system (e.g., a notebook, a handheld, or a laptop) of the individual is not connected to a computer network or is not powered (or is in a low-power mode, e.g., a sleep state). As such, according to various aspects of the present disclosure, a wireless communication device is used to provide a notification (which may include a wake-up) to an associated computer system that a software patch is available for the associated computer system. The notification may include the software patch or the notification may only advise an operator of the associated computer system that the software patch is available. According to the present disclosure, software integrity of portable computer systems can be readily maintained when the portable computer systems are not in communication with an associated computer network. Moreover, enforcement mechanisms (such as denial of service to some or all network services) that ensure that a user promptly updates an assigned computer system may be avoided.

According to various aspects of the present disclosure, a technique for providing software patches to an associated computer system includes receiving, at a wireless communication device, a communication. Next, it is determined, at the wireless communication device, whether the communication is associated with a software patch available for the associated computer system. When the communication is associated with the software patch, a notification is sent (via a wired or wireless connection) from the wireless communication device to the associated computer system that the software patch is available.

According to another aspect of the present disclosure, a wireless communication device includes a receiver and a processor. The receiver is configured to receive a communication. The processor is coupled to the receiver and is configured to determine whether the communication is associated with a software patch that is available for an associated computer system. The processor is also configured to send a notification (via a wired or wireless connection) to the associated computer system that the software patch is available when the communication is associated with the software patch.

According to another embodiment of the present disclosure, a technique for providing software patches to an associated portable computer system includes receiving, at a wireless communication device, a communication. Next, it is determined, at the wireless communication device, whether the communication is associated with a software patch available for the associated portable computer system. When the communication is associated with the software patch, a notification is sent (via a wired or wireless connection) from the wireless communication device to the associated portable computer system that the software patch is available.

With reference to FIG. 1, an example system 100 is illustrated that includes a wireless communication device 102 that is in communication with a computer system 150 (e.g., a portable computer system such as a laptop, handheld, or a notebook) and a base station (BS) 130. The BS 130 is in communication with a computer network 140, which includes a server 142. The server 142 may be utilized by IT personnel to push a software patch to various computer systems (not shown) that are included within the computer network 140. The server 142 may also provide a notification of the software patch to the computer system 150, via the device 102. The notification may include the software patch. Alternatively, the computer system 150 may connect (using a wired or wireless connection) to the computer network 140 (and the server 142) to retrieve the software patch from the server 142 in response to the notification. While the BS 130 is shown as being coupled to the computer network 140 via a wired connection, it should be appreciated that the BS 130 may communicate with the computer network 140 via a wireless connection.

As is illustrated, the wireless communication device 102 includes a processor 104 (including one or more central processing units (CPUs)) that is coupled to a transceiver 112 (which includes a receiver and a transmitter that are configured to communicate with the BS 130 according to a selected approach). The device 102 may be a mobile telephone or may be another device that also includes circuitry that comprises a mobile telephone. The BS 130 may be, for example, part of a worldwide interoperability for microwave access (WiMAX) system, a long-term evolution (LTE) system, a code division multiple access (CDMA) system, or another wireless communication system. The device 102 also includes an input device 108 (e.g., a keyboard), a wireless interface 110, and a display 106 (e.g., a liquid crystal display (LCD)), each of which are coupled to the processor 104. The processor 104 may take the form of a microcontroller, a general purpose processor, or a digital signal processor (DSP). The wireless interface 110 may be, for example, a Bluetooth™ compatible interface. Similarly, wireless interface 152 of the computer system 150 may be a Bluetooth™ compatible interface. Alternatively, the wireless interfaces 110 and 152 may take other forms, e.g., the wireless interfaces 110 and 152 may be a Wi-Fi™ interfaces. As another alternative, the wireless interfaces 110 and 152 may be replace with or include a wired interface (e.g., a universal serial bus (USB) interface) that is utilized to provide the notification from the device 102 to the computer system 150. According to another aspect of the present disclosure, in the event that the computer system 150 is incapable of accessing the network 140 (due to, for example, a driver or stack issue), an operator of the device 102 may request a software patch (to address the problem) from the network 140.

Figure 2:
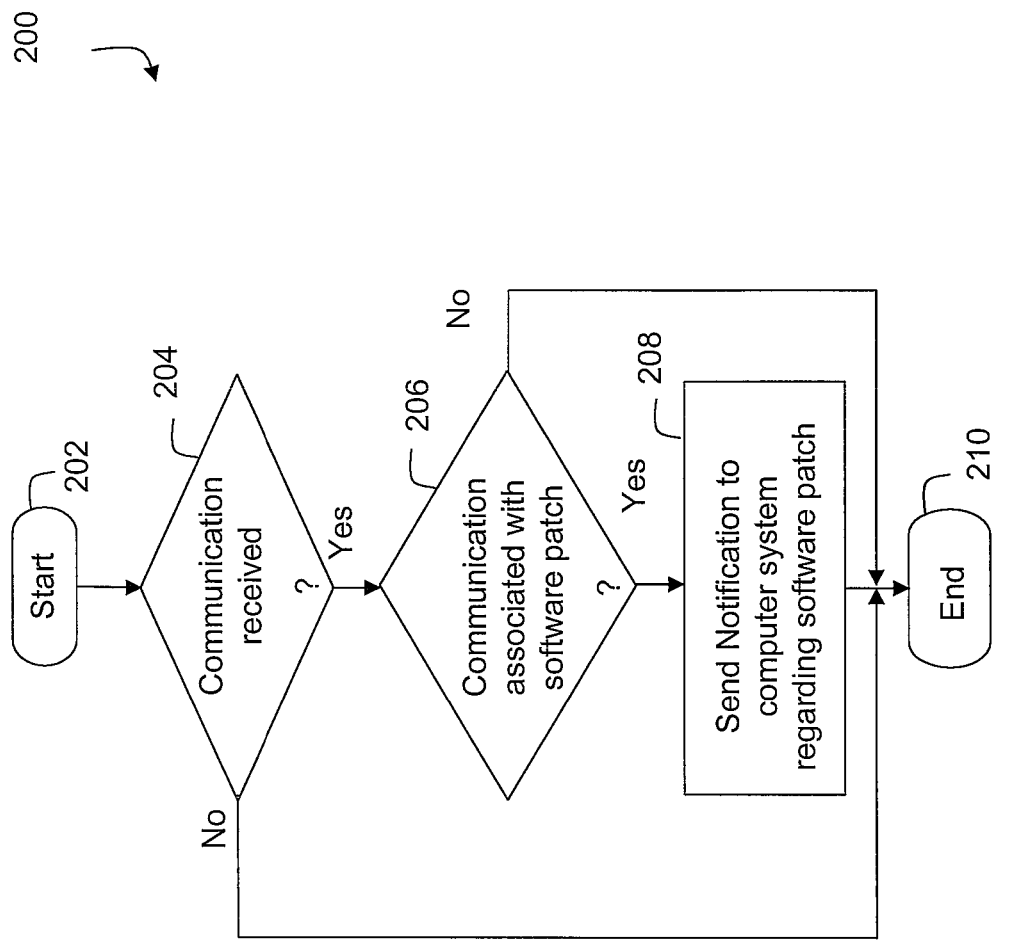
FIG. 2 is a flowchart of an example process employed in the wireless communication device of FIG. 1 to provide notification of a software patch to an associated computer system, according to various embodiments of the present disclosure.

Moving to FIG. 2, an example process 200 (employed at the device 102) is illustrated. In block 202, the process 200 is initiated at which point control transfers to decision block 204. In block 204, the processor 104 determines whether a communication has been received. If a communication has not been received in block 204 control transfers to block 210, where the process 200 terminates and control returns to a calling routine. When a communication is received in block 204, control transfers to decision block 206. In block 206, the processor 104 determines whether the communication is associated with a software patch. If the communication is not associated with a software patch, control transfers from block 206 to block 210. If the communication is associated with a software patch, control transfers from block 206 to block 208. In block 208, the device 102 sends a notification to the computer system 150 regarding the software patch. As noted above, the notification may include the software patch or may only notify the computer system 150 that the software patch is available from the server 142 of the network 140. Following block 208, control transfers to block 210 where the process 200 terminates and control returns to a calling routine.

Figure 3:
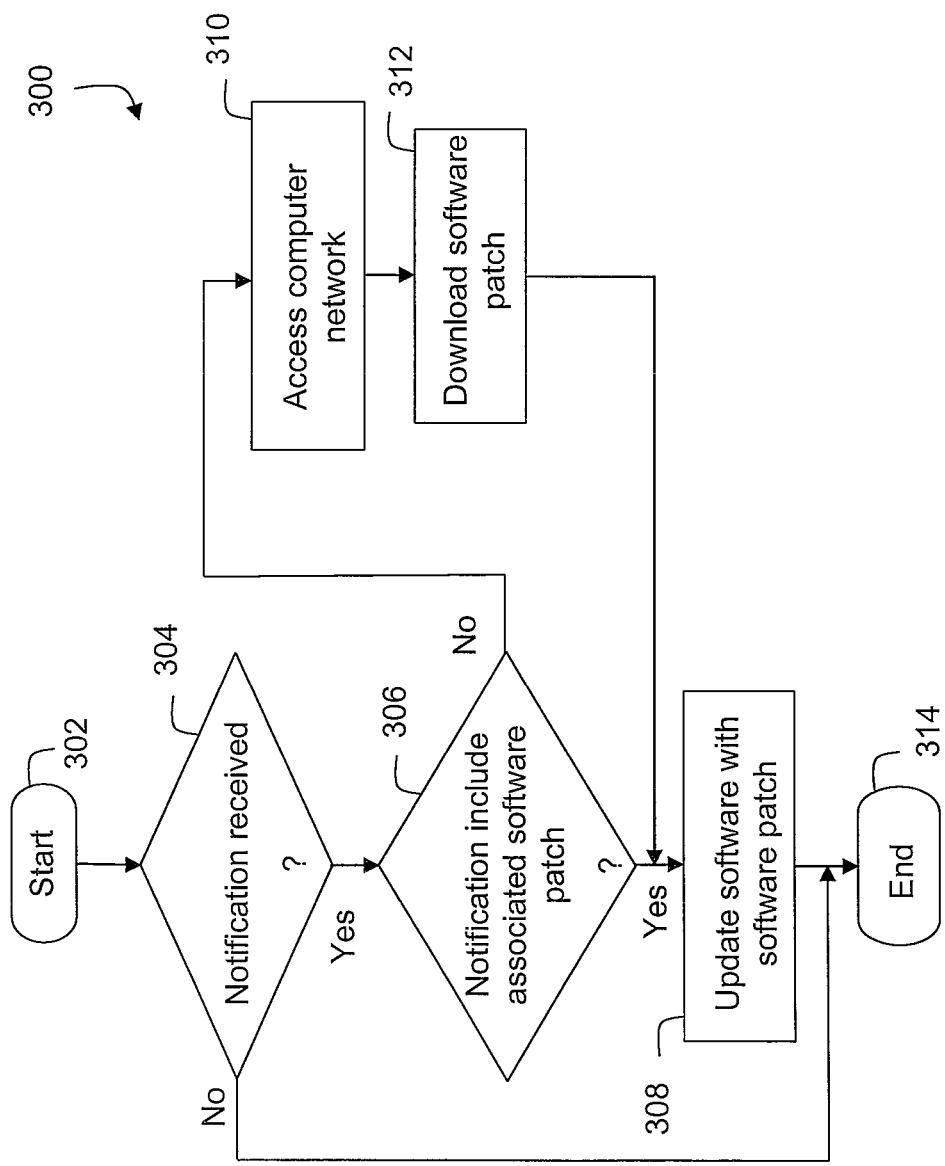
FIG. 3 is a flowchart of an example process employed in the computer system of FIG. 1 to update software of the computer system with a software patch, according to various embodiments of the present disclosure.

With reference to FIG. 3, a notification process 300 (employed at the computer system 150) is illustrated. The process 300 is initiated in block 302, at which point control transfers to decision block 304. In block 304 a processor (not shown) of the computer system 150 determines whether a notification has been received from the device 102 (via the wireless interface 152) that a software patch is available to update an application or the operating system (OS) of the computer system 150. If a notification is not received in block 304, control transfers to block 314 where the process 300 terminates and control returns to a calling routine. When a notification is received in block 304, control transfers to decision block 306. In block 306, the processor of the computer system 150 determines whether the notification includes an associated software patch. If the notification includes an associated software patch, control transfers to block 308, where appropriate software of the computer system 150 is updated with the software patch. As noted above, the software patch may be transferred from the device 102 to the computer system 150 via a wired or a wireless connection.

Following block 308 control transfers to block 314 where the process 300 terminates and control returns to a calling routine. If the notification does not include an associated software patch in block 306, control transfers to block 310. In block 310, the computer system 150 is connected to the computer network 140 (via a wired of wireless connection) so that the computer system 150 can download the software patch from the server 142. Next, in block 312, the computer system 150 downloads the software patch. Following block 312, control transfers to block 308 where the computer system updates the software of the computer system 150 with the software patch. Accordingly, techniques have been disclosed herein that facilitate updating of software of a computer system when the computer system is temporarily not in communication with an associated computer network.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, the present techniques can be implemented in any kind of system that includes a hard disk drive. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method, comprising:
   receiving at a computer system a notification informing the availability of a software patch for said computer system, wherein said notification is sent from a server to said computer system via a mobile telephone;
   in response to the receipt of said notification, determining by said computer system, whether or not said notification includes said software patch intended for said computer system;
   in response to a determination that said notification does include said software patch, transferring said software patch from said mobile telephone to said associated computer system via a wireless interface, wherein said computer system and said mobile telephone are distinct;
   in response to a determination that said notification does not include said software patch, accessing said server by said computer system to download said software patch from said server to said computer system; and updating corresponding software within said computer system with said downloaded software patch, wherein said downloaded software patch is for updating software.

2. The method of claim 1, wherein said wireless interface is BLUETOOTH standard compliant.

3. The method of claim 1, wherein said software patch is for updating an operating system.

* * * * *